United States Patent [19]
Roberts

[11] Patent Number: 5,483,744
[45] Date of Patent: Jan. 16, 1996

[54] METHOD FOR FABRICATING A BEARING WITH SEMI-RHYTHMIC BALL SPACING

[75] Inventor: John L. Roberts, Tucson, Ariz.

[73] Assignee: Hughes Aircraft Company, Los Angeles, Calif.

[21] Appl. No.: 567,993

[22] Filed: Aug. 16, 1990

Related U.S. Application Data

[62] Division of Ser. No. 344,937, Apr. 28, 1989, abandoned.

[51] Int. Cl.$^6$ .................................................. B23P 15/00
[52] U.S. Cl. .................................. 29/898.07; 29/898.01; 29/898.044
[58] Field of Search ........................... 29/445, 898.01, 29/898.044, 898.07, 898.08, 898.09, 898.13; 74/5 F; 384/523–526, 569, 572

[56] References Cited

U.S. PATENT DOCUMENTS

| | | | |
|---|---|---|---|
| 751,715 | 9/1904 | Butler | 29/898.01 X |
| 2,034,507 | 3/1936 | Colson | 29/898.01 X |
| 2,711,938 | 6/1955 | Herrmann | 384/572 |
| 3,918,778 | 11/1975 | Jacobson et al. | 384/523 X |
| 3,943,778 | 3/1976 | Wyse | 29/445 X |

FOREIGN PATENT DOCUMENTS

| | | | |
|---|---|---|---|
| 515897 | 5/1976 | U.S.S.R. | 384/523 |

OTHER PUBLICATIONS

Janes Fusca "Alloyd Explores Gyro Cleaning Techniques" Aviation Week, Dec. 1959, pp. 70–71.

*Primary Examiner*—Harold J. Tudor
*Attorney, Agent, or Firm*—Charles D. Brown; Randall M. Heald; Wanda K. Denson-Low

[57] ABSTRACT

A method and apparatus which provides a bearing design with an irregular or semi-rhythmic ball spacing. The method of the invention includes the steps of a) choosing an initial pattern for the position of the balls with an arbitrary irregular spacing therebetween; b) determining the degree to which the bearing is suitable for a given application with the chosen spacing between the balls; c) moving the balls in the pattern to change the spacing therebetween and d) repeating steps b) and c) until the bearing is suitable for a given application.

5 Claims, 4 Drawing Sheets

FIG. 3(a)
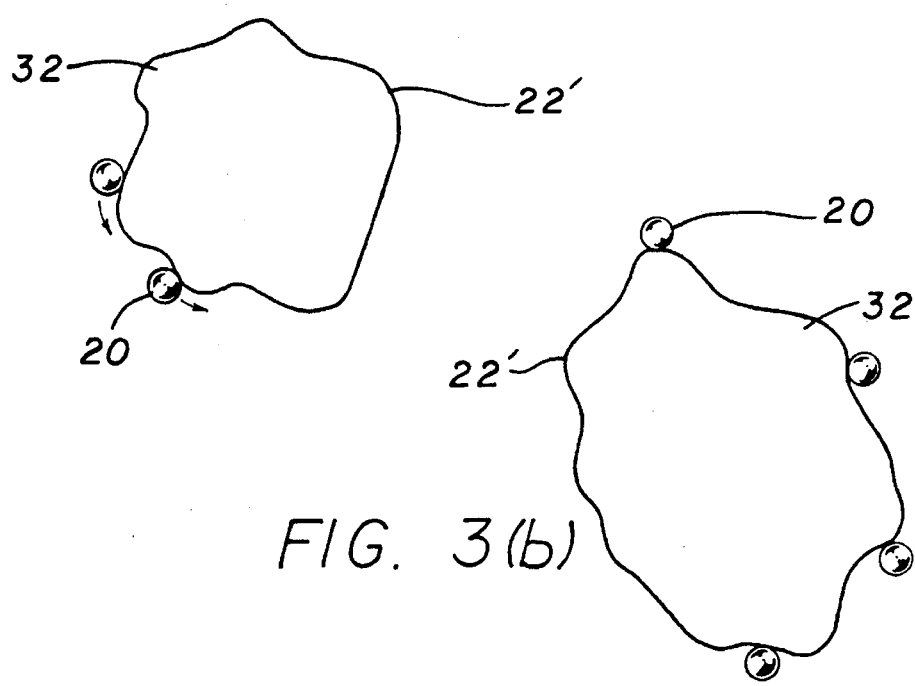
FIG. 3(b)
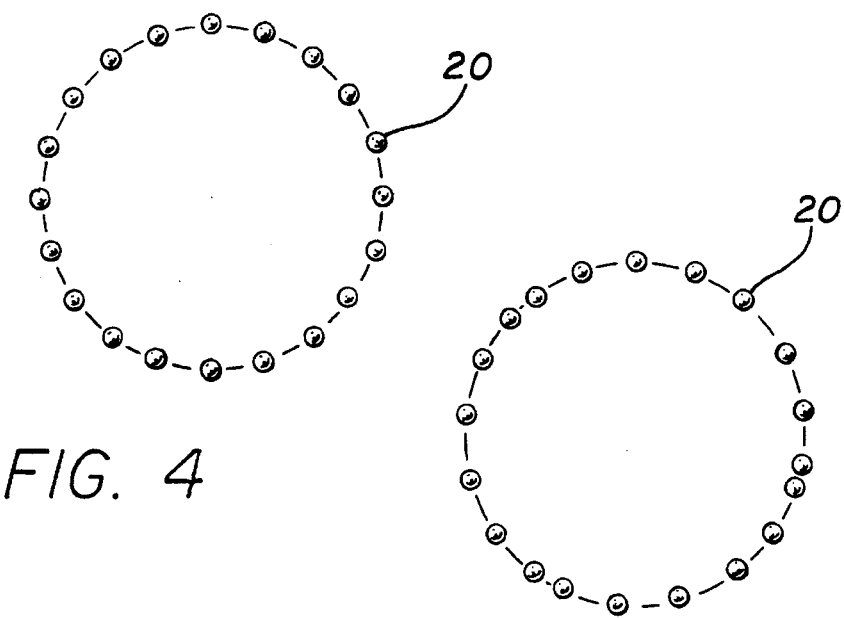
FIG. 4
FIG. 5

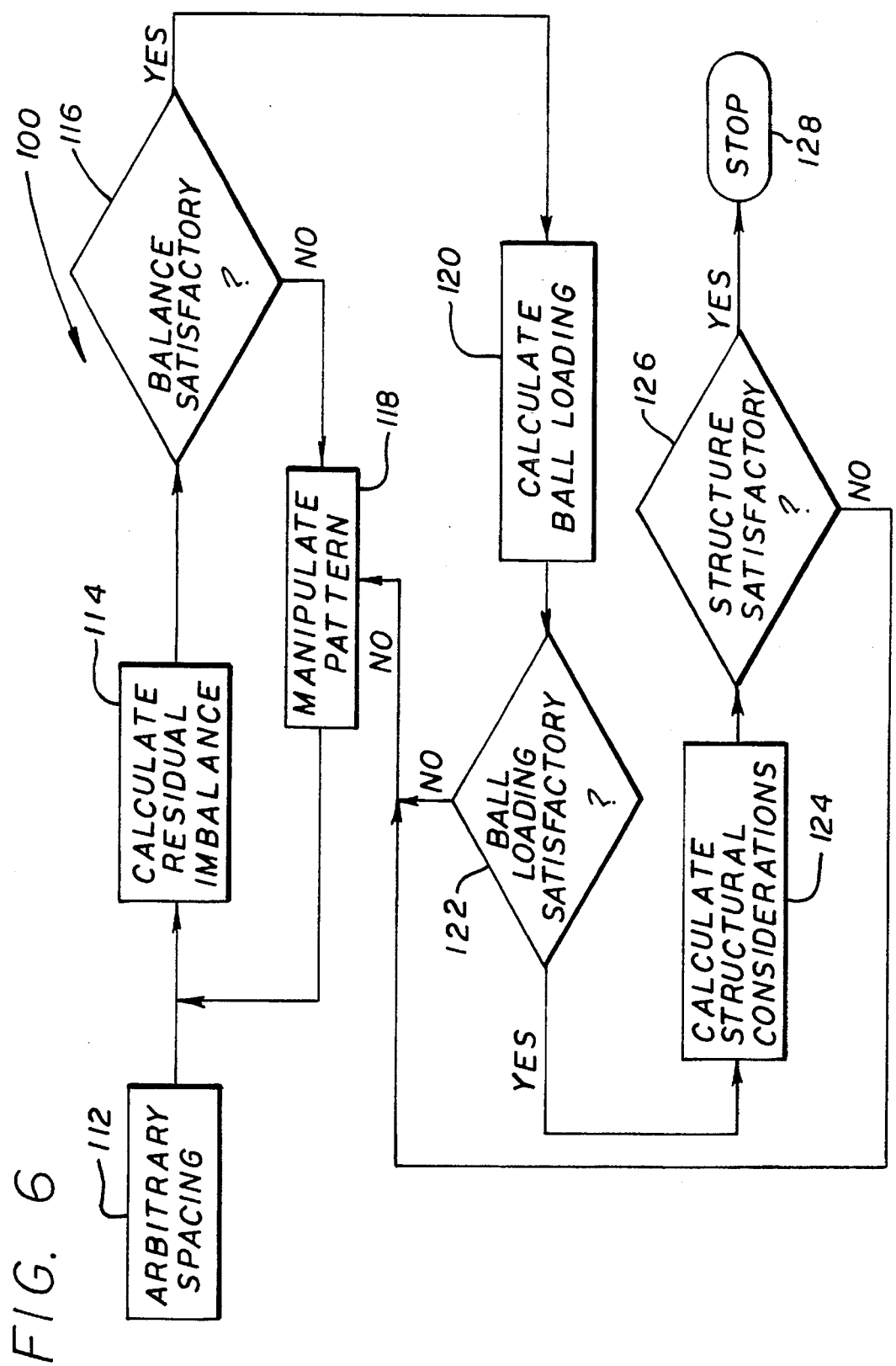

METHOD FOR FABRICATING A BEARING WITH SEMI-RHYTHMIC BALL SPACING

This invention was made with Government support under Contract No. F33657-86-C-2138 awarded by the Department of the Air Force. The Government has certain rights in this invention. This is a division of application Ser. No. 07/344,937 filed Apr. 28, 1989 now abandoned.

BACKGROUND OF THE INVENTION

1. Field of the Invention

The present invention relates to bearings. More specifically, the present invention relates to techniques for minimizing vibratory motion induced by defective bearings.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of Related Art

When a bearing is in operation, any imperfections in the ball (or roller) tracks may produce vibratory pulses. If these pulses occur regularly, a vibration output of a single frequency may develop. In certain applications, this oscillation is intolerable. One such application involves optical imaging from a platform stabilized by a gyroscope. The mass and high revolution rate of the gyroscope is typically such that single frequency vibratory pulses may result from any defects in the bearing or bearing track. If not damped, these pulses are transmitted along the optical train of the imaging system severely degrading the performance of the system.

As a result, system designers have heretofore found it necessary to either: 1) accept the vibration and design the system accordingly or 2) discard the bearing and/or 3) use a better, typically more expensive, bearing. Each alternative is costly. For example, a decision to accept the vibration would force some compromise in system performance or a system design which could overcome the effects of the vibration. And if the bearing is discarded, considerable costs would be incurred in removing and replacing the defective bearing assemblies.

Thus, there is a need in the art for a technique for salvaging defective bearings. There is also a need in the art for a technique for improving the yield of bearing fabrication to provide high quality bearings at low cost.

SUMMARY OF THE INVENTION

The need in the art is addressed by the method and apparatus of the present invention which provides a bearing design with an irregular or semi-rhythmic ball spacing. The method of the invention includes the steps of a) choosing an initial pattern for the position of the balls with an arbitrary irregular spacing therebetween; b) determining the degree to which the bearing is suitable for a given application with the chosen spacing between the balls; c) moving the balls in the pattern to change the spacing therebetween and d) repeating steps b) and c) until the bearing is suitable for a given application.

In a specific embodiment, the method of the invention includes the steps of a) choosing an initial pattern for the position of the balls with an arbitrary irregular spacing therebetween; b) determining the degree to which the bearing is balanced with the chosen spacing between the balls; c) moving the balls in the pattern to change the spacing therebetween; d) repeating steps b) and c) until the bearing is suitably balanced; e) determining the degree to which the loading on each ball is satisfactory; f) repeating steps b) through e) until the loading on each ball is satisfactory; g) determining the anisoelastic properties of the bearing; h) repeating steps b) through g) until the anisoelastic properties of the bearing are satisfactory; i) providing recesses in the separator for retaining said balls at the spacing determined by steps a) through h).

BRIEF DESCRIPTION OF THE DRAWINGS

FIG. 3(a) is a representation of a less than ideal ball track within the bearing of FIG. 1(c).

FIG. 3(b) is a view of the irregular track of FIG. 3(a) exaggerated for the purpose of illustration.

FIG. 4 is a simplified representation of the regular spacing of the conventional ball assembly.

FIG. 5 shows the irregular spacing of a bearing assembly constructed in accordance with the teachings of the present invention.

FIG. 6 is a flow chart of a specific embodiment of the method of the present invention.

DESCRIPTION OF THE INVENTION

Figure 1A:
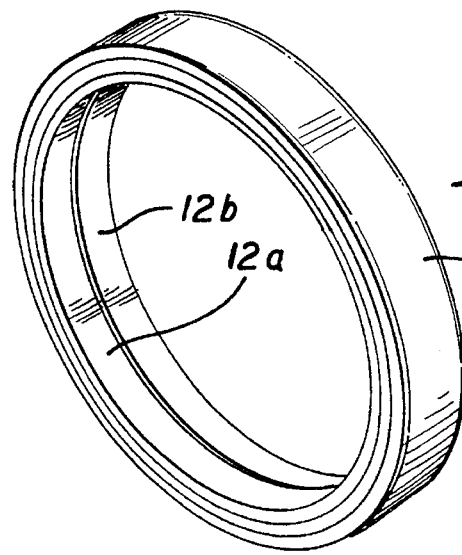
FIG. 1(a) is a perspective view of a typical conventional bearing assembly.
Figure 1B:
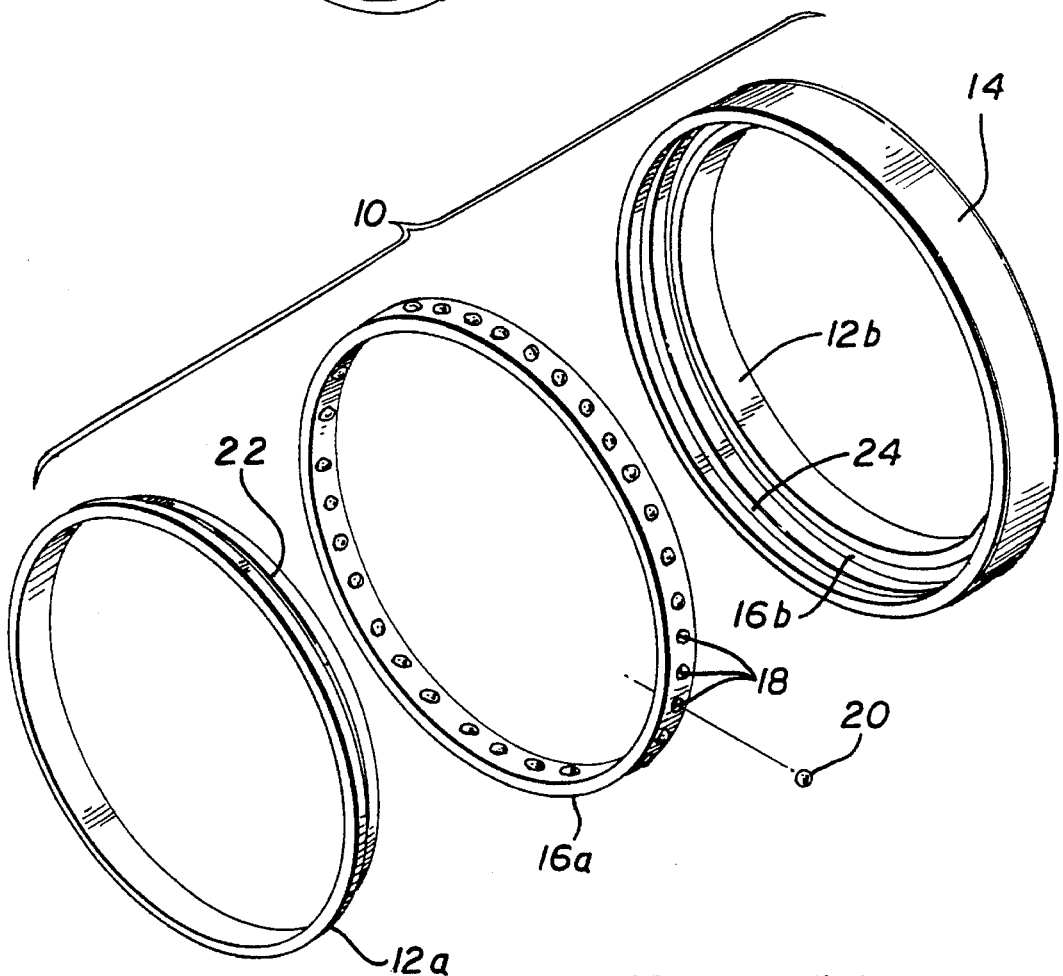
FIG. 1(b) is a partially exploded perspective view of a typical conventional bearing assembly showing a single separator with the balls in phantom.

Illustrative embodiments and exemplary applications will now be described with reference to the accompanying drawings. FIG. 1(a) is a perspective view of a typical conventional bearing assembly 10. The bearing assembly 10 of FIG. 1(a) is actually a split bearing with first and second annular inner rings 12(a) and 12(b), respectively, and an annular outer ring 14. As shown in the partially exploded perspective view of FIG. 1(b), the assembly includes first and second ball separators 16a and 16b positioned between the first inner ring 12a and the outer ring 14 and the second inner ring 12b and the outer ring 14, respectively. Each separator 16 includes a plurality of apertures or pockets 18 which serve to retain balls 20 (not shown) of the bearing assembly 10. Each inner ring 12 provides an inner ball track 22 and the outer ring 14 provides an outer ball track 24 for each of the inner ring ball sets.

Figure 1C:
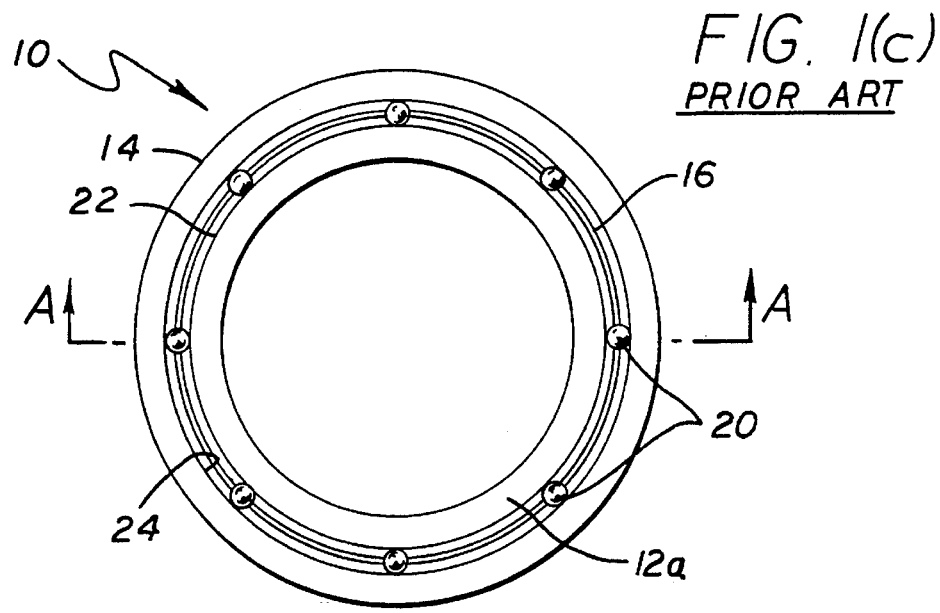
FIG. 1(c) is a top sectional view of a typical conventional bearing assembly.
Figure 1D:
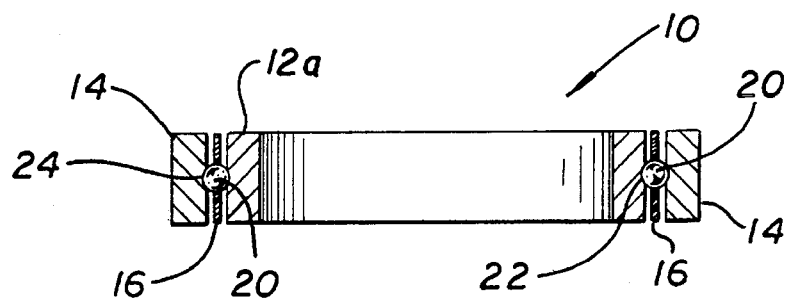
FIG. 1(d) is a side sectional view of a typical conventional bearing assembly.
Figure 1E:
FIG. 1(e) is a side view of the ball separator of the conventional bearing assembly of FIG. 1(a).

FIG. 1(c) is a top sectional view of the assembly taken through the first inner ring 12a. Note the uniform spacing of the balls in the separator 16 as is common in the art. FIG. 1(d) is a sectional side view of the assembly taken along the line A—A of FIG. 1(c). The side view of FIG. 1(e) shows the balls 20 in the separator 16. The inner and outer rings 12 and 14 are typically made of stainless steel and the balls 20 are typically made of chromed pot metal.

Figure 2:
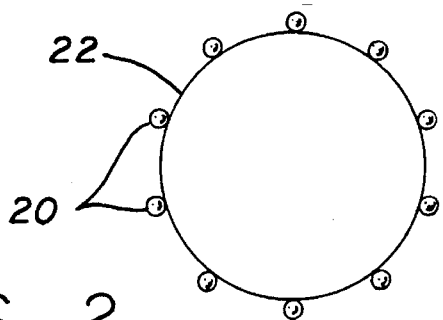
FIG. 2 is a simplified representation of an idealized ball track within the bearing of FIG. 1(c) showing balls at a regular spacing therein.

FIG. 2 is a simplified representation of an idealized inner ball track 22 showing the balls 20 at a regular spacing. If the bearing 10 were manufactured with no anomalies in the track 22 it would approach the idealized form of FIG. 2. Unfortunately, defects in the machines used to manufacture bearings including, by way of example, tool chatter, loose bearings, bad spindles and etc. produce tracks with anomalies. The anomalies result in inner and outer ball tracks 22 and 24 that are irregular and bearings that are defective for certain applications. A representative irregular ball track 22' is shown in FIG. 3(a). FIG. 3(b) is a view of the irregular ball track 22' of FIG. 3(a) exaggerated for the purpose of illustration. When the bearing assembly 10 is in operation, defects 32 in the inner ball track 22' cause the balls 20 to move away from the center of the bearing, pushing on the outer ring 14, inducing vibratory motion on the assembly 10 and, ultimately, into any mechanical assembly attached to the bearing 10. When the defects 32 are regular, the problem is more severe. Thus, for example, a defect on the order of 30 millionths of an inch may induce a vibration on the order of 10 g's into a 3 and ½ inch diameter bearing operating at 3600 revolutions per minute.

This problem is addressed by the method of the present invention which provides a bearing design with an irregular or semi-rhythmic ball spacing. The method of the invention includes the steps of a) choosing an initial pattern for the position of the balls with an arbitrary irregular spacing therebetween; b) determining the degree to which the bearing is suitable for a given application with the chosen spacing between the balls; c) moving the balls in the pattern to change the spacing therebetween and d) repeating steps b) and c) until the bearing is suitable for a given application.

In a specific embodiment, the method of the invention includes the steps of a) choosing an initial pattern for the position of the balls with an arbitrary irregular spacing therebetween; b) determining the degree to which the bearing is balanced with the chosen spacing between the balls; c) moving the balls in the pattern to change the spacing therebetween; d) repeating steps b) and c) until the bearing is suitably balanced; e) determining the degree to which the loading on each ball is satisfactory; f) repeating steps b) through e) until the loading on each ball is satisfactory; g) determining the anisoelastic properties of the bearing; h) repeating steps b) through g) until the anisoelastic properties of the bearing are satisfactory; i) providing recesses in the separator for retaining said balls at the spacing determined by steps a) through h).

FIG. 4 is a simplified representation of the traditional spacing of the balls 20 of a conventional bearing assembly 10. FIG. 5 shows a ball spacing of the in accordance with the teachings of the present invention.

In one application, the method of the invention may be practiced as follows. A bearing known to be defective is disassembled and the balls 20 are removed from the original pockets 18. As shown in the flow chart 100 of FIG. 6, an arbitrary initial spacing is selected for the balls 20. For the illustrative embodiment, the initial positions of the balls was $n\pi(2)^{1/2}$. Next, the residual imbalance of the bearing is calculated for the initial spacing. Techniques for calculating the imbalance of a bearing are well known in the art. If the balance is unsatisfactory for a given application, the ball spacings are changed and the balance is recalculated. If the ball spacings are satisfactory, the loading on each ball is calculated. If the ball loading is unsatisfactory, the ball spacing is changed and the balance and the ball loading are rechecked. If the ball loading is satisfactory, the structural considerations i.e. anisoelastic properties, are evaluated. If the structure is deemed unsatisfactory for the intended application, the ball spacing is changed again and the balance, ball loading and structure are reevaluated as per the flow chart 100. If the structure is satisfactory, the procedure is terminated.

In the illustrative embodiment, whenever the ball spacing was changed, large spaces were reduced and small spaces were increased, where possible. Also, the stop criteria was one degree of ball spacing movement without improvement in balance, a limit of 10% of the anisoelastic property in any direction, and a limit on the ball loading on any ball to less than a 10% increase over a symmetric pattern.

Finally, new pockets 18 are milled and the bearing is reassembled. In effect, the undesirable effect of regularity in the defective path 22' is mitigated by the randomizing effect of the irregular spacing of the balls 20.

Thus, the present invention has been described herein with reference to a particular embodiment for a particular application. Those having ordinary skill in the art and access to the present teachings will recognize additional modifications applications and embodiments within the scope thereof. For example, the invention is not limited to use with ball bearings. The teachings provided herein are fully applicable to roller bearings as will be appreciated by those skilled in the art. In addition, those skilled in the art will appreciate that the technique of the invention may be used in the original manufacture of the bearings as well as in the repair or overhaul thereof.

It is therefore intended by the appended claims to cover any and all such applications, modifications and embodiments within the scope of the present invention.

Accordingly,

What is claimed is:

1. A method for designing a bearing having a plurality of balls or rollers adapted for rolling engagement with a track in the bearing, said method including the steps of:

a) choosing an initial pattern for the position of the balls with an arbitrary irregular spacing therebetween;

b) determining the degree to which the bearing is suitable for a given application with the chosen spacing between the balls;

c) moving the position of the balls in the pattern thereby changing the spacing therebetween and d) repeating steps b) and c) until the bearing design is suitable for a given application.

2. The invention of claim 1 wherein said step of determining the degree to which the bearing is suitable for a given application includes the step of determining the degree to which the bearing is balanced.

3. The invention of claim 1 wherein said step of determining the degree to which the bearing is suitable for a given application includes the step of determining a loading on each ball.

4. The invention of claim 1 wherein said step of determining the degree to which the bearing is suitable for a given application includes the step of determining the anisoelastic properties of the bearing.

5. A method for fabricating a bearing having a plurality of balls or rollers adapted for rolling engagement with a track in the bearing, said method including the steps of:

a) choosing an initial pattern for the position of the balls with an arbitrary irregular spacing therebetween;

b) determining the degree to which the bearing design is balanced with the chosen spacing between the balls;

c) moving the position of the balls in the pattern thereby changing the spacing therebetween;

d) repeating steps b) and c) until the bearing design is suitably balanced;

e) determining the degree to which the loading on each ball is satisfactory;

f) repeating steps b) through e) until the loading on each ball is satisfactory;

g) determining the anisoelastic properties of the bearing;

h) repeating steps b) through g) until the anisoelastic properties of the bearing design are satisfactory; and i) providing recesses in the track for retaining said balls at the spacing determined by steps a) through h).

* * * * *